(12) United States Patent
Zhou et al.

(10) Patent No.: US 11,385,502 B1
(45) Date of Patent: Jul. 12, 2022

(54) NEAR-EYE DISPLAY APPARATUS

(71) Applicant: BOE Technology Group Co., Ltd., Beijing (CN)

(72) Inventors: Zhenxing Zhou, Beijing (CN); Tao Hong, Beijing (CN); Chengfu Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/356,035

(22) Filed: Jun. 23, 2021

(30) Foreign Application Priority Data

Dec. 23, 2020 (CN) .......................... 202011536437.9

(51) Int. Cl.
| | |
|---|---|
| *G02F 1/13357* | (2006.01) |
| *G02F 1/1335* | (2006.01) |
| *G02B 27/01* | (2006.01) |
| *G02F 1/13363* | (2006.01) |

(52) U.S. Cl.
CPC ..... *G02F 1/13362* (2013.01); *G02B 27/0172* (2013.01); *G02F 1/133526* (2013.01); *G02F 1/133536* (2013.01); *G02F 1/133541* (2021.01); *G02F 1/133638* (2021.01); *G02B 2027/0178* (2013.01)

(58) Field of Classification Search
CPC .................................................. G02F 1/13362
See application file for complete search history.

(56) References Cited

U.S. PATENT DOCUMENTS

2013/0033485 A1\* 2/2013 Kollin ................... G06F 3/0484
345/660
2019/0285902 A1\* 9/2019 Ouderkirk ............ G02B 3/0043

\* cited by examiner

*Primary Examiner* — Edmond C Lau
(74) *Attorney, Agent, or Firm* — Workman Nydegger

(57) ABSTRACT

Disclosed are a near-eye display apparatus. The near-eye display apparatus comprises: a display screen; a polarization converter; an imaging lens group; a semi-transparent and semi-reflective layer arranged between the polarization converter and the first lens; a reflective polarized layer arranged on the side, facing away from the polarization converter, of the semi-transparent and semi-reflective layer, the polarization direction of the first linearly polarized light is vertical to the polarization direction of the second linearly polarized light; and a liquid crystal lens arranged between the semi-transparent and semi-reflective layer and the reflective polarized layer. When the liquid crystal lens is switched between the first phase retardation amount and the second phase retardation amount, the light path of light in the near-eye display apparatus changes, so that the near-eye display apparatus can image at two focal lengths.

14 Claims, 8 Drawing Sheets

NEAR-EYE DISPLAY APPARATUS

CROSS-REFERENCE OF RELATED APPLICATIONS

The present Applications claims the priority of Chinese Patent Application No. 202011536437.9, filed with the China National Intellectual Property Administration on Dec. 23, 2020 and entitled "Near-eye Display Apparatus", the entire content of which is hereby incorporated by reference.

FIELD

The present disclosure relates to the technical field of display, in particular to a near-eye display apparatus.

BACKGROUND

Near-eye display is a hot content of current research, such as virtual reality display in the form of helmet and augmented reality display in the form of smart glasses. Near-eye display can provide people with an unprecedented sense of interaction, and has important application values in numerous fields such as telemedicine, industrial design, education, military virtual training, and entertainment.

Virtual reality, VR, technology presents a fully-enclosed virtual environment, creating an immersive viewing experience in a three-dimensional environment by means of a display module. The display principle is that the left and right eye screens respectively display the images of the left and right eyes, and the human eyes acquire such information with differences to produce a three-dimensional sense in the mind.

SUMMARY

The present disclosure provides a near-eye display apparatus, including:

a display screen, configured to display a first image and a second image in a time-division mode;

a polarization converter, arranged on a light emitting side of the display screen, and configured to convert light emitted from the display screen into first circularly polarized light;

an imaging lens group, arranged on the light emitting side of the display screen, and configured to image an image displayed on the display screen; the imaging lens group at least includes a first lens;

a semi-transparent and semi-reflective layer, arranged between the polarization converter and the first lens;

a reflective polarized layer, arranged on a side, facing away from the polarization converter, of the semi-transparent and semi-reflective layer, and configured to reflect the first linearly polarized light and transmit second linearly polarized light, a polarization direction of the first linearly polarized light is vertical to a polarization direction of the second linearly polarized light; and a liquid crystal lens, arranged between the semi-transparent and semi-reflective layer and the reflective polarized layer;

the liquid crystal lens generates a first phase retardation amount when the display screen displays the first image, and transmits the first circularly polarized light passing through the semi-transparent and semi-reflective layer, so that the reflective polarized layer partially transmits the first circularly polarized light; and the liquid crystal lens generates a second phase retardation amount when the display screen displays the second image, and converts the first circularly polarized light passing through the semi-transparent and semi-reflective layer into the first linearly polarized light, so that the first linearly polarized light is reflected by the reflective polarized layer; then converts the reflected first linearly polarized light into the first circularly polarized light, so that the first circularly polarized light is reflected by the semi-transparent and semi-reflective layer and then converted into second circularly polarized light rotating in an opposite direction to the first circularly polarized light; and then converts the second circularly polarized light into second linearly polarized light, so that the second linearly polarized light is transmitted by the reflective polarized layer.

In some embodiments, the first phase retardation amount generated by the liquid crystal lens is 0, and the second phase retardation amount generated by the liquid crystal lens is $\pi/2$ or an odd multiple of $\pi/2$.

In some embodiments, the imaging lens group further includes: a second lens; the second lens is arranged between the polarization converter and the semi-transparent and semi-reflective layer; or, the second lens is arranged between the polarization converter and the display screen.

In some embodiments of the present disclosure, the display screen is a liquid crystal display;

the polarization converter is a quarter wave plate, and an included angle between a fast axis of the quarter wave plate and a transmission axis of the reflective polarized layer on a light emitting side of the liquid crystal display is 45°, the polarization converter is a circular polarizer; the circular polarizer includes: a polarizer near the liquid crystal display and a quarter wave plate arranged on a side, facing away from the liquid crystal display, of the polarizer; the transmission axis of the polarizer is parallel to a transmission axis of the polarized layer on the light emitting side of the liquid crystal display, and an included angle between a fast axis of the quarter wave plate and the transmission axis of the reflective polarized layer on the light emitting side of the liquid crystal display is 45°.

In some embodiments, the display screen is one of organic light-emitting diode display, micro organic light-emitting diode display or micro light-emitting diode display; and the polarization converter is a circular polarizer.

In some embodiments, the polarization converter is attached to a surface, facing the imaging lens group, of the display screen.

In some embodiments, a total thickness of the semi-transparent and semi-reflective layer, the liquid crystal lens and the reflective polarized layer does not exceed 4 mm.

In some embodiments, a semi-transparent and semi-reflective layer is arranged on a surface, facing away from the reflective polarized layer, of the liquid crystal lens; and the reflective polarized layer is arranged on a surface, facing away from the semi-transparent and semi-reflective layer, of the liquid crystal lens.

In some embodiments, a surface type of a lens in the imaging lens group is a spherical surface, an aspherical surface, a Fresnel surface or a free-form surface.

In some embodiments, a ratio of transmittance of the semi-transparent and semi-reflective layer to reflectivity of the semi-transparent and semi-reflective layer is 1:1.

In some embodiments, a range of an effective focal length of the near-eye display apparatus is 15 mm to 55 mm.

In some embodiments, the near-eye display apparatus further includes:

a driver chip, connecting the liquid crystal lens and the display screen;

an image processor, connecting the display screen; and
a central processing unit, connecting the driver chip and the image processor;
the image processor is configured to transmit to-be-displayed image data to the display screen under the control of the central processing unit; and
the driver chip is configured to output a first driving signal to the display screen under the control of the central processing unit, such that the display screen displays the first image and the second image in the time-division mode, and output a second driving signal to the liquid crystal lens, such that the liquid crystal lens generates a first phase retardation amount when the display screen displays the first image and generates a second phase retardation amount when the display screen displays the second image.

In some embodiments, the near-eye display apparatus is a virtual reality device.

BRIEF DESCRIPTION OF THE DRAWINGS

In order to more clearly illustrate the technical solutions of embodiments of the present disclosure, a brief description will be given below on the accompanying drawings to be used in embodiments of the present disclosure, obviously, the accompanying drawings presented below are only some embodiments of the present disclosure, and other accompanying drawings can be obtained from these drawings without any creative work for those of ordinary skills in the art.

DETAILED DESCRIPTION OF THE EMBODIMENTS

Figure 1:
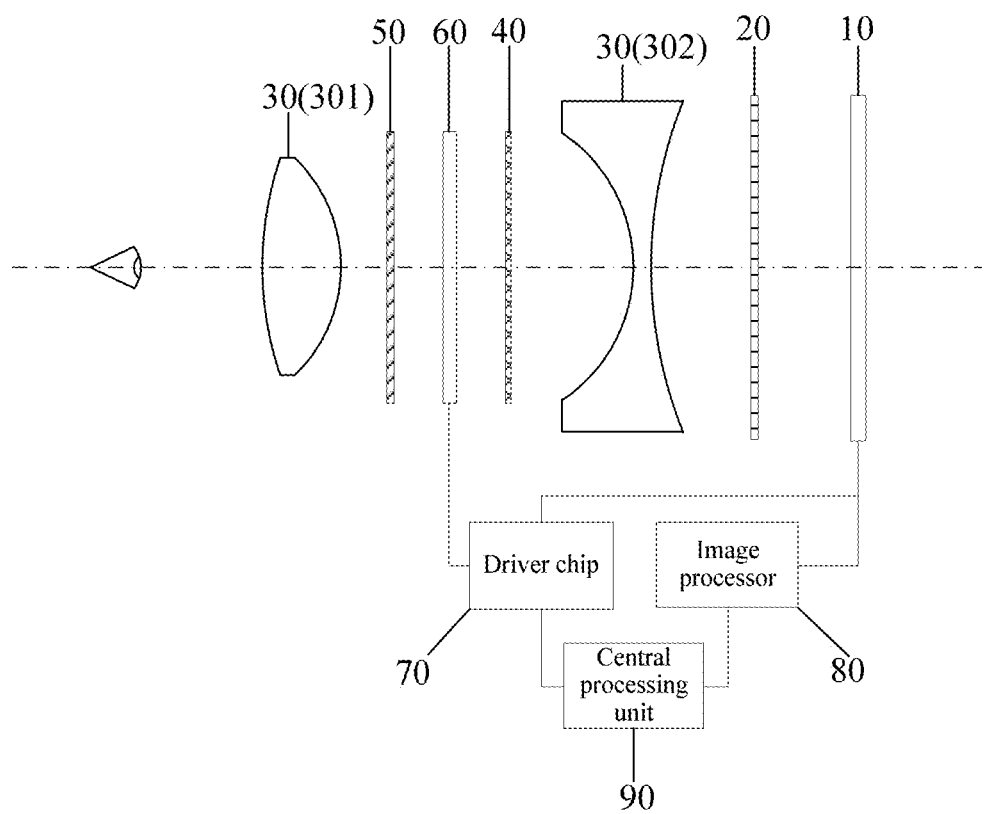
FIG. 1 is a first structural schematic diagram of a near-eye display apparatus provided in embodiments of the present disclosure.

In order to make the above objects, characteristics and advantages of the present disclosure more apparent and understandable, the present disclosure will be further described below in combination with the accompanying drawings and embodiments. However, exemplary embodiments can be implemented in a variety of forms and should not be construed as being limited to embodiments set forth herein; on the contrary, these embodiments are provided to make the present disclosure more comprehensive and complete and communicate the concepts of exemplary embodiments to those skilled in the art in a comprehensive manner. Identical reference numerals in the figures represent identical or similar structures, and therefore, repetitive descriptions of them will be omitted. Words used to express position and orientation described in the present disclosure are illustrated using the accompanying drawings as examples, but changes may be also made as needed, and any changes made are included in the protection scope of the present disclosure. The accompanying drawings of the present disclosure are merely used to show the relative position relationship and do not represent the true proportions.

A near-eye display apparatus is a display apparatus that is worn on the eyes of a user, for example, a near-eye display apparatus is usually presented in the form of glasses or a helmet. Near-eye display apparatus can provide users with AR and VR experiences. In the AR near-eye display technology, the virtual image generated by the near-eye display apparatus is superimposed with the real-world live image, so that the user can see the final enhanced live image on the screen. In the VR near-eye display technology, the images of the left and right eyes are respectively displayed on the near-eye display corresponding to the left and right eyes, and the left and right eyes can synthesize stereo vision in the brain after acquiring the image information with differences.

As to the currently used AR/VR display apparatus, the focal length of the display screen is fixed, and the human eyes focus on the same image surface for a long time when observing the displayed picture, which conflicts with the regulation of the optic nerve by the brain. When the human eyes continue to watch such a displayed picture for too long, fatigue and vertigo will occur and convergence conflicts will arise.

FIG. 1 is a first structural schematic diagram of a near-eye display apparatus provided in embodiments of the present disclosure.

As shown in FIG. 1, embodiments of the present disclosure provide a near-eye display apparatus, including:
a display screen 10, configured to display a first image and a second image in a time-division mode; and
a polarization converter 20, arranged on a light emitting side of the display screen 10, configured to convert the light emitted from the display screen 10 into first circularly polarized light;
an imaging lens group 30, arranged on the light emitting side of the display screen 10, configured to image the image displayed on the display screen 10; wherein the imaging lens group 30 at least includes a first lens 301;
a semi-transparent and semi-reflective layer 40, arranged between the polarization converter 20 and the first lens 301;
a reflective polarized layer 50, arranged on the side, facing away from the polarization converter 20, of the semi-transparent and semi-reflective layer 40, configured to reflect the first linearly polarized light and transmit the second linearly polarized light, the polarization direction of the first linearly polarized light is vertical to the polarization direction of the second linearly polarized light; and
a liquid crystal lens 60, arranged between the semi-transparent and semi-reflective layer 40 and the reflective polarized layer 50, configured to generate different phase retardation amount when the display screen 10 displays different images.

As shown in FIG. 1, the near-eye display apparatus further includes:

a driver chip 70, connecting the liquid crystal lens 60 and the display screen 10;

an image processor 80, connecting the display screen 10; and a central processing unit 90, connecting the driver chip 70 and the image processor 80;

the image processor 80 is configured to transfer to-be-displayed image data to the display screen 10 under the control of the central processing unit 90; and the driver chip 70 is configured to output a first driving signal to the display screen 10 under the control of the central processing unit 90, such that the display screen 10 displays a first image and a second image in a time-division mode, and output a second driving signal to the liquid crystal lens 60, such that the liquid crystal lens 60 generates a first phase retardation amount when the display screen 10 displays the first image and generates a second phase retardation amount when the display screen 10 displays the second image.

Figure 2:
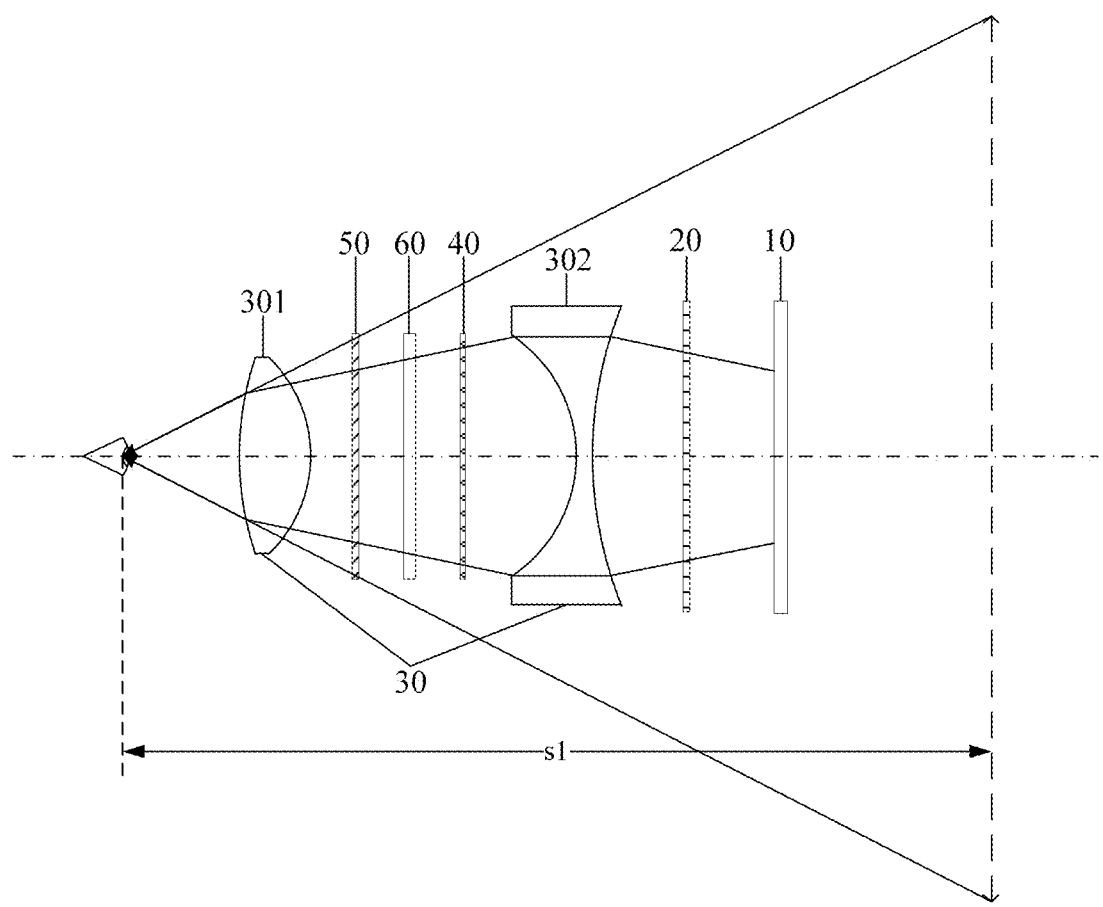
FIG. 2 is a first schematic diagram of a light path of a near-eye display apparatus provided in embodiments of the present disclosure.

FIG. 2 is a first schematic diagram of a light path of the near-eye display apparatus provided in embodiments of the present disclosure.

As shown in FIG. 2, the liquid crystal lens 60 generates a first phase retardation amount when the display screen 10 displays the first image. At this time, the first phase retardation amount generated by the liquid crystal lens 60 is 0, i.e., the phase difference is 0 for o light and e light, then no phase retardation is generated after the light passes through the liquid crystal lens 60, and the polarization state does not change.

The light of the first image emitted from the display screen 10 is converted into the first circularly polarized light after passing through the polarization converter 20; after the first circularly polarized light is incident into the semi-transparent and semi-reflective layer 40, some of the light is transmitted and other parts of the light are reflected, and the light transmitted by the semi-transparent and semi-reflective layer 40 is still the first circularly polarized light; the first circularly polarized light transmitted by the semi-transparent and semi-reflective layer 40 is still the first circularly polarized light after passing through the liquid crystal lens 60. The first circularly polarized light transmitted by the liquid crystal lens 60 can be decomposed into components parallel with and vertical to the transmission axis of the reflective polarized layer 50, and the component parallel to the transmission axis of the reflective polarized layer 50 can be transmitted through the reflective polarized layer 50 and incident into the position in which the human eyes are located, and the human eyes can view the first virtual image at a distance of s1 from the human eyes.

Figure 3:
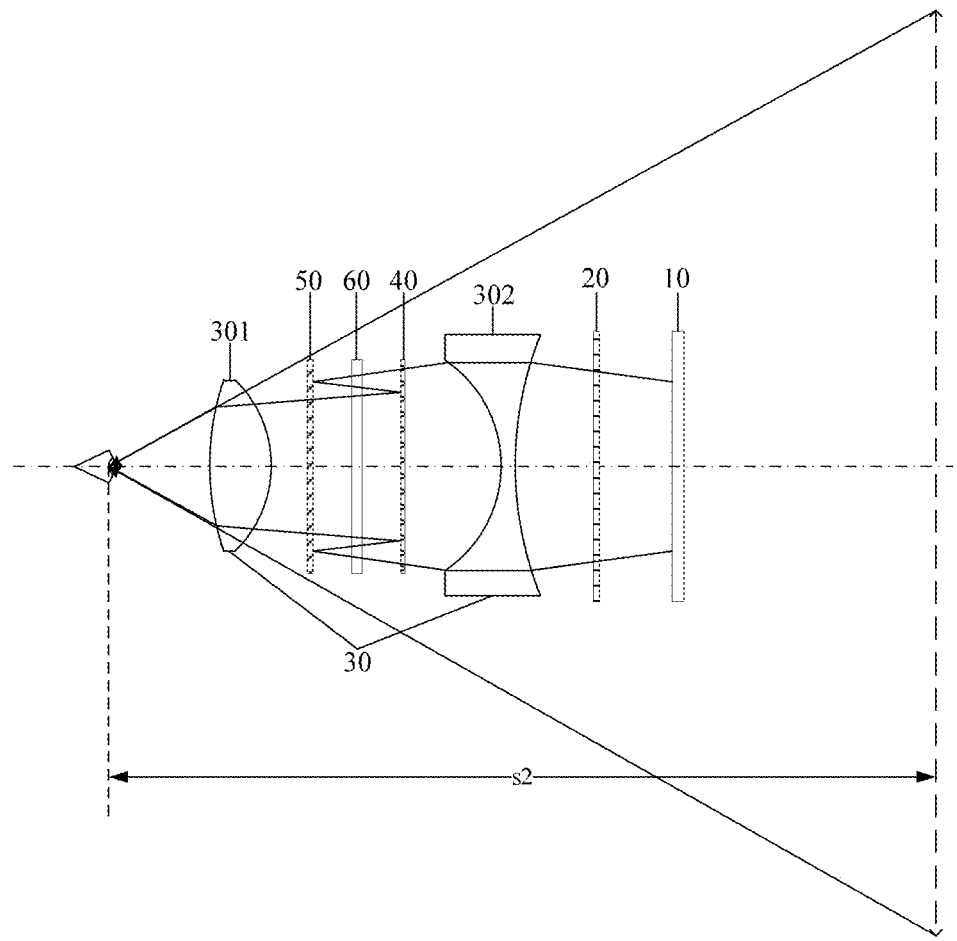
FIG. 3 is a second schematic diagram of a light path of a near-eye display apparatus provided in embodiments of the present disclosure.

FIG. 3 is a second schematic diagram of a light path of a near-eye display apparatus provided in embodiments of the present disclosure.

As shown in FIG. 3, the liquid crystal lens 60 generates a second phase retardation amount when the display screen 10 displays the second image, at this time, the liquid crystal lens 60 generates a second phase retardation amount of e retardation amount 10 displays the second image, at this time, the liquid crystal lens 60 generates a crystal lens 60. The first circularly polarized light transmitted by the liquid crystal lens 60 can be decompocircularly polarized light is converted into the first linearly polarized light after passing through the liquid crystal lens 60.

The light of the first image emitted from the display screen 10 is converted into the first circularly polarized light after passing through the polarization converter 20; after the first circularly polarized light passes through the semi-transparent and semi-reflective layer 40, some of the light is transmitted and other parts of the light are reflected, and the light transmitted by the semi-transparent and semi-reflective layer 40 is still the first circularly polarized light; the first circularly polarized light transmitted by the semi-transparent and semi-reflective layer 40 is still the first linearly polarized light after passing through the liquid crystal lens 60. The reflective polarized layer 50 is used to reflect the first linearly polarized light and transmit the second linearly polarized light, then the first linearly polarized light converted by the liquid crystal lens 60 is reflected when it is incident into the reflective polarized layer 50; the first linearly polarized light reflected by the reflective polarized layer 50 is incident into the liquid crystal lens 60 again, and the liquid crystal lens 60 converts the first linearly polarized light into the first circularly polarized light again. The first circularly polarized light converted by the liquid crystal lens 60 is incident into the semi-transparent and semi-reflective layer 40, after the first circularly polarized light is incident into the semi-transparent and semi-reflective layer 40, part of the light is transmitted and the other parts of the light are reflected, the rotation direction of the circularly polarized light reflected by the semi-transparent and semi-reflective layer 40 changes to be opposite and is converted into the second circularly polarized light; the second circularly polarized light reflected by the semi-transparent and semi-reflective layer 40 is incident into the liquid crystal lens 60, at this time, the liquid crystal lens 60 converts the second circularly polarized light into the second linearly polarized light; the reflective polarized layer 50 is configured to reflect the first linearly polarized light and transmit the second linearly polarized light, then the second linearly polarized light converted by the liquid crystal lens 60 is transmitted when it is incident into the reflective polarized layer 50, and is incident into the position in which the human eyes are located, and the human eyes can view the second virtual image at a distance of s2 from the human eyes.

It can be seen through comparison of FIG. 2 and FIG. 3 that, when the liquid crystal lens 60 is controlled to switch between the first phase retardation amount and the second phase retardation amount, the light path of light in the near-eye display apparatus changes, i.e., the object distance of light incident into the first lens 301 changes, so that the near-eye display apparatus can image at two focal lengths, thereby enabling the human eyes to view an image with a certain depth of field, achieving a three-dimensional display effect and avoiding convergent conflict.

It should be noted that the above first circularly polarized light can be a right-hand circularly polarized light, the second circularly polarized light can be a left-hand circularly polarized light; or the first circularly polarized light can be a left-hand circularly polarized light, and the second circularly polarized light can be a right-hand circularly polarized light, which is not limited herein.

The conversion of the polarization state of the light in the near-eye display apparatus is illustrated using the conversion of the light emitted from the display screen 10 into a right-hand circularly polarized light after passing through the polarization converter 20 as an example.

When the phase retardation amount generated by the liquid crystal lens 60 is 0, the right-hand circularly polarized light converted by the polarization converter 20 remains as the right-hand circularly polarized light after passing through the semi-transparent and semi-reflective layer 40 and the liquid crystal lens 60, and then is converted into linearly polarized light after passing through the reflective polarized layer 50 and is incident into the human eyes.

When the phase retardation amount generated by the liquid crystal lens 60 is π/2 or an odd multiple of π/2, the polarization converter is a quarter wave plate, and an included angle between a fast axis of the quarter wave plate and a transmission axis/reflection axis of the reflective polarized layer on a light emitting side of the liquid crystal display is 45°. The right-hand circularly polarized light converted by the polarization converter 20 is still a right-hand circularly polarized light after passing through the semi-transparent and semi-reflective layer 40, and then is converted into linearly polarized light (0°) passing through the liquid crystal lens 60 (+45°); the polarization direction of the linearly polarized light is parallel to the reflection axis of the reflective polarizing layer 50 and will be reflected by the reflective polarizing layer 50. The reflected linearly polarized light (0°) is converted into right-hand circularly polarized light after passing through the liquid crystal lens 60 (−45°) again, and the right-hand circularly polarized light is converted into a left-hand circularly polarized light after being reflected by the semi-transparent and semi-reflective layer 40, and the right-hand circularly polarized light is converted into a linearly polarized light (90°) after passing through the liquid crystal lens 60 (+45°), and the polarization direction is parallel to the transmission axis of the reflective polarized layer 50, and the linearly polarized light will be transmitted by the reflective polarized layer 50 and is incident into the human eyes.

In some embodiments, as shown in FIG. 1 to FIG. 3, the imaging lens group 30 may also include a second lens 302; the second lens 302 may be arranged between the polarization converter 20 and the semi-transparent and semi-reflective layer 40 (as shown in FIG. 1 to FIG. 3); or, the second lens 302 may also be arranged between the polarization converter 20 and the display screen 10 (not shown in the figures), which is not limited herein.

Regarding the imaging lens group 30 including the above first lens 301 and second lens 302, when the liquid crystal lens 60 is switched to generate the first phase retardation amount and the second phase retardation amount, it is equivalent to changing the distance between the first lens 301 and the second lens 302. Therefore, the focal length of the imaging lens group 30 will change along with the switching of the phase retardation amount of the liquid crystal lens 60, so that the near-eye display apparatus can generate two focal lengths, thereby enabling the human eyes to view an image with a certain depth of field, achieving a three-dimensional display effect and avoiding convergence conflicts.

Figure 4:
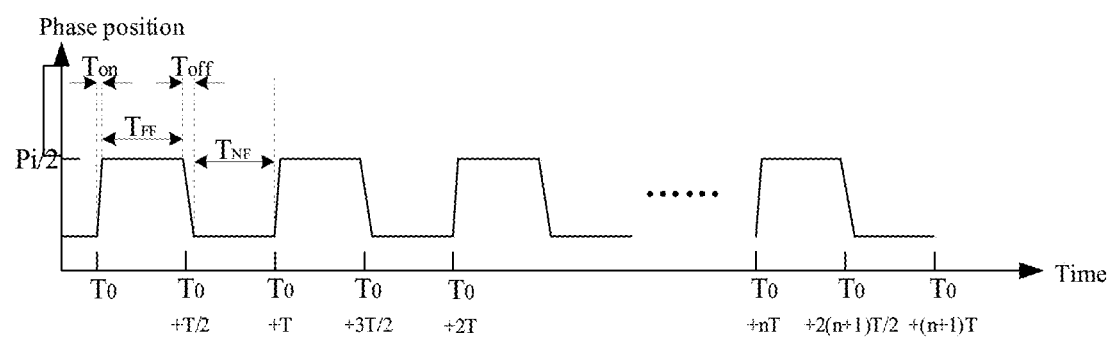
FIG. 4 is a phase change graph of a liquid crystal lens provided in embodiments of the present disclosure.
Figure 5:
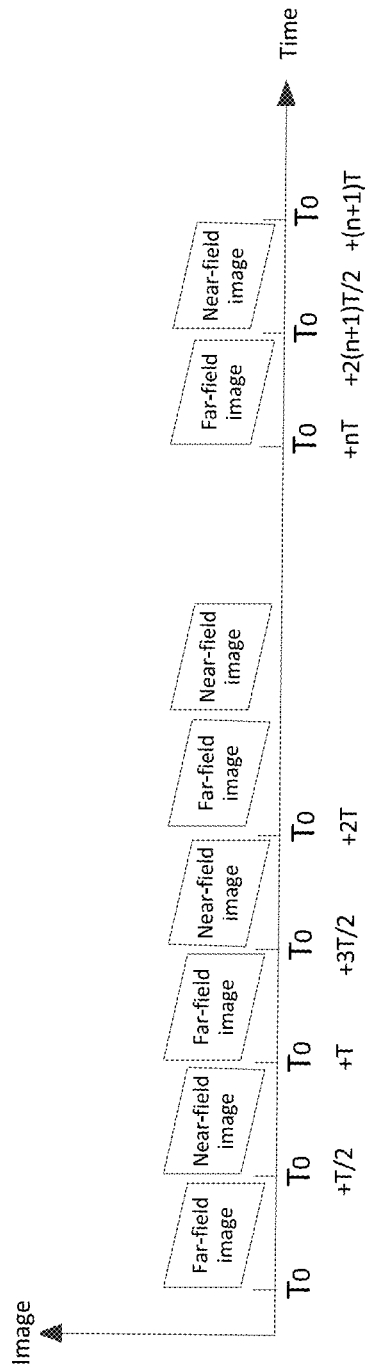
FIG. 5 is a schematic diagram of the relationship between the display image and time of the display screen provided in embodiments of the present disclosure.

FIG. 4 is a phase change graph of a liquid crystal lens provided in embodiments of the present disclosure; and FIG. 5 is a schematic diagram of the relationship between the display image and time of the display screen provided in embodiments of the present disclosure.

As shown in FIG. 4, the horizontal coordinate represents the system operation time, and the vertical coordinate represents the phase retardation amount of liquid crystal lens 60. As shown in FIG. 4, suppose the system starts running from the moment $T_0$, the starting phase retardation amount is 0, and after the rising edge time $T_{on}$, the phase retardation amount becomes π/2, at this time, the optical range difference generated in the liquid crystal lens 60 is $\Delta n \cdot d = \lambda/4$, and the modulation effect on the polarized light is equivalent to a quarter wave plate. After a continuous period of $T_{FF}$, after the falling edge time $T_{off}$, the phase retardation amount becomes 0, at this time, the optical range difference generated in the liquid crystal lens 60 is 0, which is equivalent to a flat glass. After a continuous period of $T_{NF}$, the phase retardation amount switches to π/2 again and switches according to the above rules.

According to the above analysis on the light path, it can be seen that when the phase retardation amount of the liquid crystal lens 60 is 0, the liquid crystal lens 60 is equivalent to flat glass, and the light path of the near-eye display apparatus is shown in FIG. 2, the light emitted by the display screen 10 is incident into the polarization converter 20, is incident into the second lens 302 after passing through the polarization converter 20, is incident into the semi-transparent and semi-reflective layer 40 after passing through the second lens 302, is incident into the liquid crystal lens 60 after passing through the semi-transparent and semi-reflective layer 40, is incident into the reflective polarized layer 50 after passing through the liquid crystal lens 60, is incident into the first lens 301 after passing through the reflective polarized layer 50, and is finally incident into human eyes after passing through the first lens 301.

When the phase retardation amount of the liquid crystal lens 60 is incident into the reflective polarized layer 50 after passing through the liquid crystal lens 60, the light path of the near-eye display apparatus is as shown in FIG. 3, the light emitted from the display screen 10 is incident into the polarization converter 20, is incident into the second lens 302 after passing through the polarization converter 20, is incident into the semi-transparent and semi-reflective layer 40 after passing through the second lens 302, is incident into the liquid crystal lens 60 after passing through the semi-transparent and semi-reflective layer 40, is incident into the reflective polarized layer 50 after passing through the liquid crystal lens 60, is incident into the liquid crystal lens 60 again after being reflected by the reflective polarized layer 50, is incident into the semi-transparent and semi-reflective layer 40 again after passing through the liquid crystal lens 60, is incident into the liquid crystal lens 60 again after being reflected by the semi-transparent and semi-reflective layer 40, is incident into the first lens 301 again after passing through the liquid crystal lens 60, and is finally incident into human eyes after passing through the first lens 301.

It can be known through comparison of FIG. 2 and FIG. 3 that, when the liquid crystal lens 60 is equivalent to a quarter wave plate, the light is reflected between the semi-transparent and semi-reflective layer 40 and the reflective polarized layer 50, which is equivalent to increasing the distance between the first lens 301 and the second lens 302, thereby making the focal length of the imaging lens group 30 increase, and the virtual image formed at this time is farther from the position of the human eyes. Therefore, the second image displayed by the display screen 10 is a far-field image when the liquid crystal lens 60 is equivalent to a quarter wave plate, and the first image displayed by the display screen 10 is a near-field image when the liquid crystal lens 60 is equivalent to a plate glass. As shown in FIG. 5, the near-field image and the far-field image displayed by the display screen 10 will be switched synchronously as the liquid crystal lens 60 switches the phase retardation amount.

At present, the process of liquid crystal lens is becoming more and more mature, which can achieve extremely high phase accuracy and extremely short response time. Generally speaking, the rising edge time $T_{on}$ of the liquid crystal state switching can be 0.1 ms to 0.3 ms; the falling edge time $T_{off}$ can be 0.4 ms to 0.7 ms, i.e., the total response time is within 0.5 ms to 1.0 ms, and with the continuous progress of technology and process, the response time can be further shortened.

As shown in FIG. 3, the working period of the liquid crystal lens 60 is $T=T_{on}+T_{FF}+T_{off}+T_{NF}$. If the frame rate of the picture seen by human eyes is 100 Hz, then T=1000 ms/100 hz=10 ms, according to $T_{on}+T_{off}=1$ ms, then $T_{FF}+T_{NF}=9$ ms, usually $T_{FF}=T_{NF}$ can be set, then $T_{FF}=T_{NF}=4.5$ ms. At this time, the refresh frequency of the display screen 10 is required to be greater than or equal to 2*100=200 Hz. Accordingly, the display screen 10 also needs to display the image information in a time-division mode according to a time sequence, specifically as shown in FIG. 5, with the interval of every T/2 time, the display screen 10 alternately displays the far-field image (second image) and the near-field image (first image), and the display time of each image is 5 ms.

In some embodiments, the display screen 10 can adopt any one of liquid crystal display, micro light-emitting diode display, organic light-emitting diode display, and micro organic light-emitting diode display, which is not defined herein.

A liquid crystal display, LCD, is mainly composed of a backlight module and a liquid crystal display panel. The liquid crystal display panel itself does not emit light, but relies on the light source provided by the backlight module to achieve brightness display. The principle of LCD display is to place the liquid crystal between two pieces of conductive glass, the electric field effect of distortion of liquid crystal molecules is caused under the drive of two electrodes, to control the backlight transmission or masking function, so as to display the image. If a color filter is added, the color image can be displayed. The liquid crystal display technology is mature, and the liquid crystal display screen is low in cost and excellent in performance.

Micro-light emitting diode, Micro-LED, displays are display screens that use micro-LED arrays, which take micro-LED as display sub-pixels and control the display brightness of each micro-LED to achieve image display. Micro-LED displays are characterized by high brightness, low power consumption, low voltage requirements, and compact and convenient device. The use of micro-LED display as the display screen 10 in the near-eye display apparatus facilitates the miniaturization of the near-eye display apparatus.

Organic light-emitting diode, OLED, displays belong to a current-type organic light-emitting device, and is a phenomenon to emit light through the injection and combination of carriers, the light-emitting intensity is proportional to the injected current. As to the OLED, under the effect of the electric field, the holes generated by the anode and the electrons generated by the cathode will move, are respectively injected to the hole transport layer and the electron transport layer, and migrated to the light-emitting layer. When the two are met at the light-emitting layer, energy excitons are generated, so as to excite the light-emitting molecules to finally produce visible light. OLED displays are self-luminous display screens, so they do not need to be equipped with backlight modules, the overall thickness of the device is small, which is conducive to the miniaturization of the near-eye display apparatus, and is more conducive to the installation of the whole machine.

The micro organic light-emitting diode displays miniaturize the light-emitting units of organic light-emitting diodes, thereby setting more pixels in a limited size and increasing the resolution of the display screen.

When the display screen 10 adopts a liquid crystal display, since the light emitting side of the liquid crystal display is provided with a polarized layer, therefore, the polarization converter 20 at the light emitting side of the display screen 10 can adopt a quarter wave plate, and the included angle between the fast axis of the quarter wave plate and the transmission axis of the polarized layer on the light emitting side of the liquid crystal display may be kept to be 45°.

Or, the polarization converter 20 may also adopt a circular polarizer. Typically, the circular polarizer includes a polarizer near the side of the liquid crystal display (10) and a quarter wave plate located on the side, facing away from the liquid crystal display (10), of the polarizer. During specific setting, the transmission axis of the polarizer in the circular polarizer is parallel to the transmission axis of the polarized layer on the light emitting side of the liquid crystal display, and the included angle between the fast axis of the quarter wave plate in the circular polarizer and the transmission axis of the polarized layer on the light emitting side of the liquid crystal display is 45°.

Therefore, the objective of changing the light emitted from the display screen 10 into a circularly polarized light can be achieved.

When the display screen 10 uses one of an organic light-emitting diode display, a micro organic light-emitting diode display, or a micro light-emitting diode display, the light emitted from the display screen 10 is natural light, so the polarization converter 20 located on the light emitting side of the display screen 10 uses a circular polarizer. Similarly, the circular polarizer includes a polarizer near the side of the display screen 10 and a quarter wave plate located on side, facing away from the display screen 10, of the polarizer. In the specific setting, the included angle between the transmission axis of the polarizer in the circular polarizer and the fast axis of the quarter wave plate is 45°, therefore, the purpose of converting the light emitted from the display screen 10 into circularly polarized light can be achieved.

Figure 6:
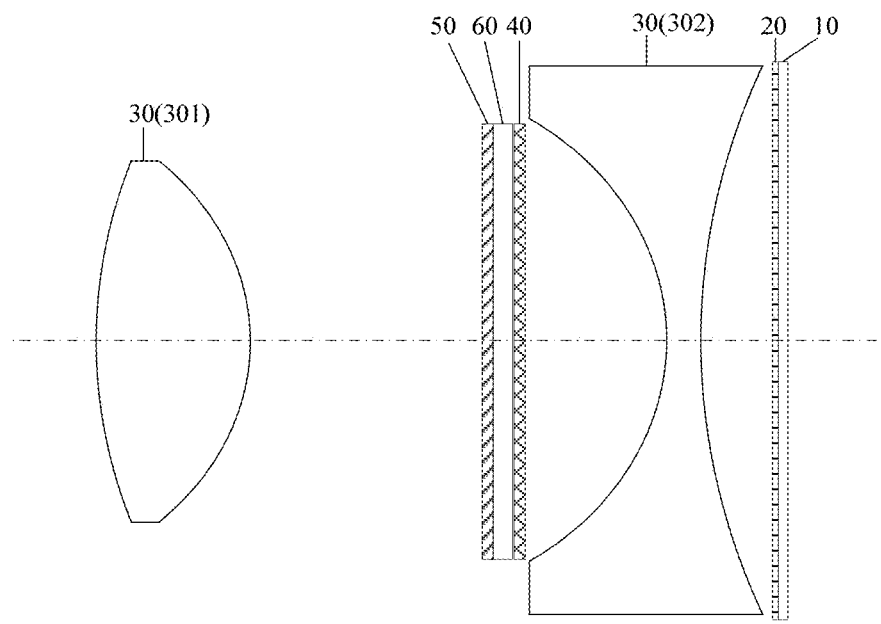
FIG. 6 is a second structural schematic diagram of a near-eye display apparatus provided in embodiments of the present disclosure.

FIG. 6 is a second structural schematic diagram of a near-eye display apparatus provided in embodiments of the present disclosure.

As shown in FIG. 6, the polarization converter 20 can be set between the second lens 302 and the display screen 10. The polarization converter 20 can be a circular polarizer, and the polarization converter 20 can be directly attached to the surface of the side, facing the imaging lens group 30, of the display screen 10.

In addition, the structure of the semi-transparent and semi-reflective layer 40, the liquid crystal lens 60 and the reflective polarized layer 50 is compactly set, and the total thickness of the three from the semi-transparent and semi-reflective layer 40 to the reflective polarized layer 50 does not exceed 4 mm. Optionally, as shown in FIG. 6, the semi-transparent and semi-reflective layer 40 can be arranged on the surface of the side, facing away from the reflective polarized layer 50, of the liquid crystal lens 60, and the reflective polarized layer 50 can be arranged on the surface of the side, facing away from the semi-transparent and semi-reflective layer 40, of the liquid crystal lens 60.

By attaching the polarization converter 20 to the surface of the light emitting side of the display screen 10, and by attaching the semi-transparent and semi-reflective layer 40 and the reflective polarized layer 50 to the surface of both sides of the liquid crystal lens 60, the substrate used to support the above film layers can be omitted, thereby facilitating installation of each component in the near-eye display apparatus.

In some embodiments, the ratio of transmittance to reflectivity of the semi-transparent and semi-reflective layer 40 is 1:1. Therefore, when the display screen 10 displays a first image and the phase retardation amount generated by the liquid crystal lens 60 is 0, the light of the first image emitted from the display screen 10 is reduced to ½ of the initial energy after passing through the polarization converter 20, and is converted into first circularly polarized light; after passing through the semi-transparent and semi-reflective layer 40, half of the energy of the first circularly polarized light is reflected, forming invalid light, and the light energy of the transmitted first circularly polarized light is reduced to ¼ of the initial energy; the first circularly polarized light is incident into the reflective polarized layer 50 after passing through the liquid crystal lens 60, and the component of the first circularly polarized light with the same direction as the reflective axis of the reflective polarized layer 50 is reflected, forming an invalid light, and the remaining component with the same transmission axis as the reflective polarized layer 50 is transmitted, the light intensity of the transmitted light is reduced to ⅛ of the initial energy, i.e., the light intensity reaching the human eyes is ⅛ of the original light intensity of the display screen 10.

When the display screen 10 displays the second image and the phase retardation amount generated by the liquid crystal lens 60 is π/2 or an odd multiple of π/2, the light intensity of the light of the second image emitted from the display screen 10 is reduced to ½ of the initial energy after passing through the polarization converter 20, and the light is converted into the first circularly polarized light; after the first circularly polarized light passes through the semi-transparent and semi-reflective layer 40, half of the energy is reflected, forming invalid light, and the light energy of the transmitted first circularly polarized light is reduced to ¼ of the initial energy; the first circularly polarized light is converted into linearly polarized light with the polarization direction parallel to the reflection axis of the reflective polarized layer 50 after passing through the liquid crystal lens 60, and is reflected completely by the reflective polarized layer 50; the linearly polarized light is converted into the first circularly polarized light after passing through the liquid crystal lens 60 again. When the first circularly polarized light is incident into the semi-transparent and semi-reflective layer 40 again, half of the energy is transmitted, forming an invalid light, the light energy of the reflected light is reduced to ⅛ of the initial energy, and the reflected light is converted into the second circularly polarized light; when the second circularly polarized light passes through the liquid crystal lens 60 again, it is converted into linearly polarized light with the polarization direction parallel to the transmission axis of the reflective polarized layer 50, and is transmitted completely by the reflective polarized layer 50, and the light intensity of the transmitted light is still ⅛ of the initial energy, i.e., the light intensity reaching the human eyes is ⅛ of the original light intensity of the display screen 10.

It can be seen that the light intensity reaching the human eyes is the same for the first image and the second image, and there is no difference between the two images in light and dark.

In some embodiments, the imaging lens group 30 at least includes the first lens 301, and the surface type of the lens in the imaging lens group 30 can be spherical, aspheric, Fresnel or free-form surface. Spherical lens has the advantages of simple design and low assembly accuracy requirements, while aspheric lens Fresnel lens and free-form surface lens have relatively small thickness, which can optimize the image quality and can be selected according to actual needs during optical design.

In order to adapt to the actual use scenario, a range of an effective focal length of the near-eye display apparatus is designed to be 15 mm to 55 mm, and the numeral value is not limited herein. In some embodiments, the near-eye display apparatus can be designed in the form of glasses or helmets applicable to VR devices.

The simulated effect of the above near-eye display apparatus provided in embodiments of the present disclosure is introduced below with a design example.

Figure 7:
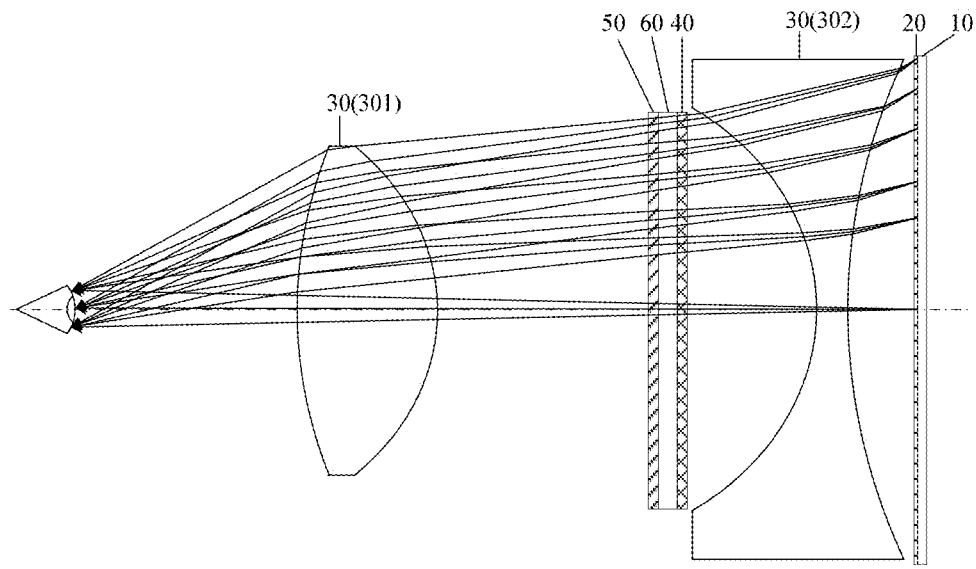
FIG. 7 is a simulated diagram of the light path of the near-eye display apparatus provided in embodiments of the present disclosure during near-field display.

FIG. 7 is a simulated diagram of the light path of the near-eye display apparatus provided in the embodiments of the present disclosure during near-field display.

As shown in FIG. 7, the imaging lens group 30 includes a first lens 301 and a second lens 302. For the parameter simulation of each surface in the near-eye display apparatus, please refer to the following table:

| | Surface/Type | Curvature radius | Thickness | Material | Cone coefficient | 2-order item | 4-order item | 6-order item | 8-order item | 10-order item |
|---|---|---|---|---|---|---|---|---|---|---|
| 0 | Standard surface of object surface | Infinite | −399.905347 | | 0 | | | | | |
| 1 | Standard surface of diaphragm | Infinite | 15.000000 | | 0 | | | | | |
| 2 | Evenly aspherical surface | 70.969220 | 9.837313 | POLY-CARB | −0.134907 | 0 | −4.395061E−6 | 6.893541E−9 | −6.689720E−12 | 3.416918E−15 |
| 3 | Evenly aspherical surface | −28.845990 | 14.965902 | | −0.148585 | 0 | 1.638109E−06 | 2.375304E−09 | 5.516089E−13 | 5.310145E−15 |
| 4 | Standard surface | Infinite | 0.200000 | PMMA | 0 | | | | | |
| 5 | Standard surface | Infinite | 0.800000 | BK7 | 0 | | | | | |
| 6 | Standard surface | Infinite | 0.200000 | PMMA | 0 | | | | | |
| 7 | Standard surface | Infinite | 9.717095 | | 0 | | | | | |
| 8 | Spherical surface | −33.091058 | 1.963732 | PMMA | 0 | 0 | 0 | 0 | 0 | 0 |
| 9 | Spherical surface | 98.634024 | 4.780000 | | 0 | 0 | 0 | 0 | 0 | 0 |

-continued

| Surface/Type | Curvature radius | Thickness | Material | Cone coefficient | 2-order item | 4-order item | 6-order item | 8-order item | 10-order item |
|---|---|---|---|---|---|---|---|---|---|
| 10 Standard surface | Infinite | | PMMA | 0 | | | | | |
| 11 Standard surface of image surface | Infinite | — | | 0 | | | | | |

The surface type of both surfaces of the first lens 301 is evenly aspherical, and the surface type of both surfaces of the second lens 302 is standard spherical; except for the imaging lens group 30, the media surface of the reflective polarized layer 50, the liquid crystal lens 60, the semi-transparent and semi-reflective layer 40 and the polarization converter 20 are all planar. The distance of the virtual image surface of the near-field display system from the human eyes is 399.905347 mm, and the distance of the human eyes from the first lens 301 is 15 mm; the entry pupil diameter of the system is 4 mm, and the OPD reference position is the exit pupil position; the effective focal length of the near-field display system is 43.97119 mm, the back focal length is 4.677659 mm; and the total length of the near-eye display apparatus is 57.56404 mm. The image space F/# is 10.9928, the near-axis processing F/# is 9.800372, and the working F/# is 9.760632. The near-axis imaging height is 36.55598 mm, and the near-axis magnification is 0.09802692; the maximum radial field of view is 43 degrees, and the angular magnification is 1.106567. The main wavelength is 0.5875618 μm, The light path obtained through near-field display simulation according to the above parameters is shown in FIG. 7, and the spot diagram and the optical transfer function of the above display system are tested in the embodiments of the present disclosure.

Figure 8:
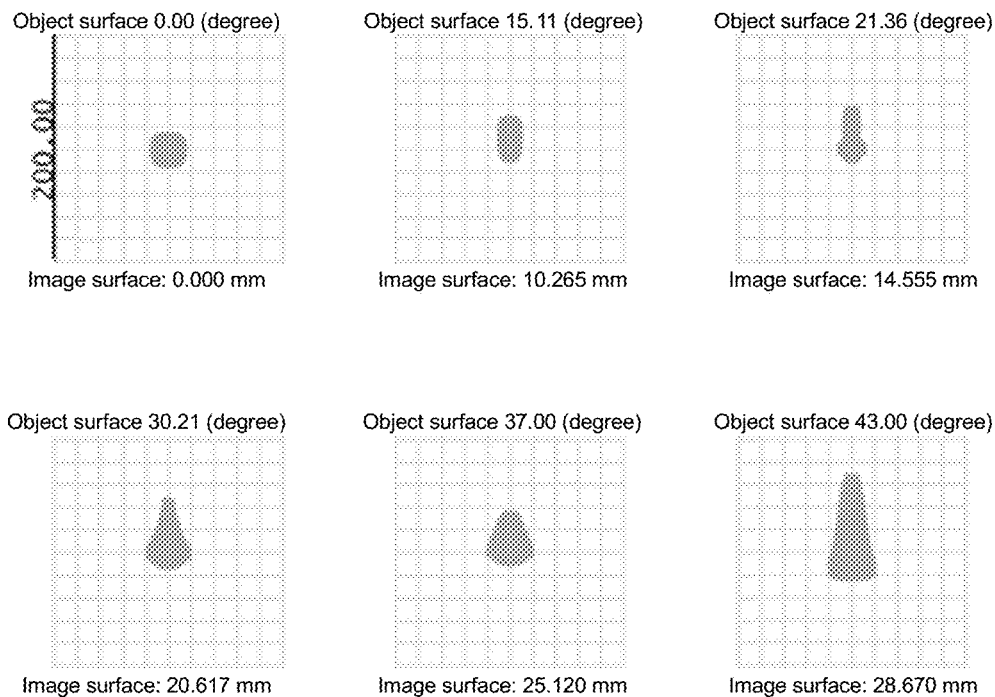
FIG. 8 is a spot diagram of the near-eye display apparatus provided in embodiments of the present disclosure during near-field display.

FIG. 8 is a spot diagram of the near-eye display apparatus provided in the embodiments of the present disclosure during near-field display.

As shown in FIG. 8, the object surface represents the location of the virtual image surface, and the image surface represents the location of the human eyes. It can be seen from FIG. 8 that, the image point sizes obtained on the image surface for points at different field angles on the object surface are all in a smaller range, which meets the application requirements of the near-eye display apparatus.

Figure 9:
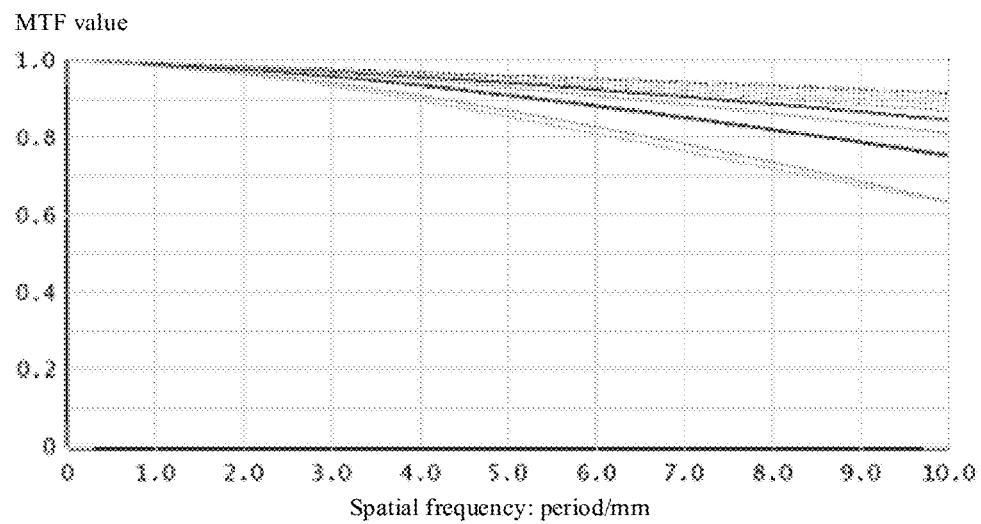
FIG. 9 is a graph of optical transfer function of the near-eye display apparatus provided in embodiments of the present disclosure during near-field display.

FIG. 9 is a graph of optical transfer function of the near-eye display apparatus provided in the embodiments of the present disclosure during near-field display.

As shown in FIG. 9, the horizontal coordinate represents the spatial frequency, and the vertical coordinate represents the modulation transfer function, MTF, value, and the MTF value is an important parameter reflecting the optical system. The uppermost curve in FIG. 9 represents the diffraction limit when the field angle is 0. The closer the MTF value at different field angles is to the uppermost curve, the better the imaging effect of the imaging system. It can be seen from FIG. 9 that, after parameter optimization of the near-eye display apparatus provided by embodiments of the present disclosure, the optical transfer function of the full field of view can meet the imaging requirement and has better imaging performance.

Figure 10:
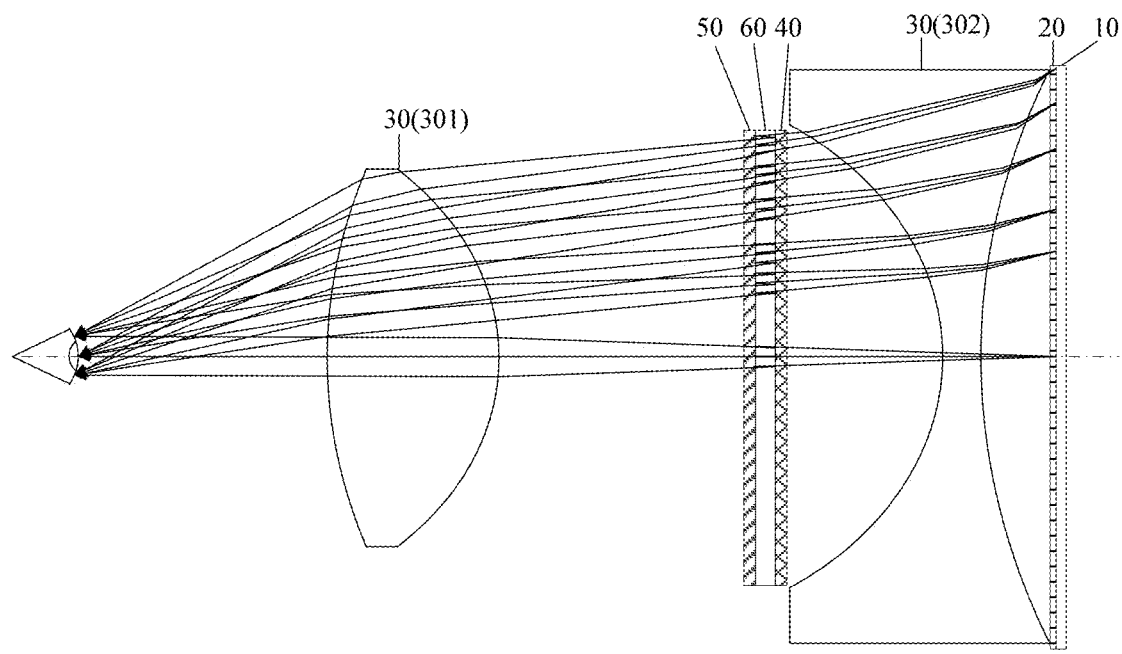
FIG. 10 is a simulated diagram of the light path of the near-eye display apparatus provided in embodiments of the present disclosure during far-field display.

FIG. 10 is a simulated diagram of the light path of the near-eye display apparatus provided in embodiments of the present disclosure during far-field display.

As shown in FIG. 10, the imaging lens group 30 includes a first lens 301 and a second lens 302. For the parameter simulation of each surface in the near-eye display apparatus, please refer to the following table:

| Surface/Type | Curvature radius | Thickness | Material | Cone coefficient | 2-order item | 4-order item | 6-order item | 8-order item | 10-order item |
|---|---|---|---|---|---|---|---|---|---|
| 0 Standard surface of object surface | Infinite | −1437.8373 | | 0 | | | | | |
| 1 Standard surface of diaphragm | Infinite | 15.000000 | | 0 | | | | | |
| 2 Evenly aspherical surface | 70.969220 | 9.837313 | POLY-CARB | −0.134907 | 0 | −4.395061E−6 | 6.893541E−9 | −6.689720E−12 | 3.416918E−15 |
| 3 Evenly aspherical surface | −28.845990 | 14.965902 | | −0.148585 | 0 | 1.638109E−06 | 2.375304E−09 | 5.516089E−13 | 5.310145E−15 |
| 4 Standard surface | Infinite | 0.200000 | PMMA | 0 | | | | | |
| 5 Standard surface | Infinite | 0.800000 | BK7 | 0 | | | | | |
| 6 Standard surface | Infinite | 0.200000 | PMMA | 0 | | | | | |
| 7 Standard surface | Infinite | −0.200000 | MIRROR | 0 | | | | | |
| 8 Standard surface | Infinite | −0.800000 | | 0 | | | | | |
| 9 Standard surface | Infinite | −0.200000 | | 0 | | | | | |

-continued

| Surface/Type | Curvature radius | Thickness | Material | Cone coefficient | 2-order item | 4-order item | 6-order item | 8-order item | 10-order item |
|---|---|---|---|---|---|---|---|---|---|
| 10 Standard surface | Infinite | 0.200000 | MIRROR | 0 | | | | | |
| 11 Standard surface | Infinite | 0.800000 | BK7 | 0 | | | | | |
| 12 Standard surface | Infinite | 0.200000 | PMMA | 0 | | | | | |
| 13 Standard surface | Infinite | 9.717095 | | 0 | | | | | |
| 14 Spherical surface | −33.091058 | 1.963732 | PMMA | 0 | 0 | 0 | 0 | 0 | 0 |
| 15 Spherical surface | 98.634024 | 4.780000 | | 0 | 0 | 0 | 0 | 0 | 0 |
| 16 Standard surface | Infinite | 0.100000 | PMMA | 0 | | | | | |
| 17 Standard surface of image surface | Infinite | — | | 0 | | | | | |

The surface type of both surfaces of the first lens 301 is evenly aspherical, and the surface type of both surfaces of the second lens 302 is standard spherical; except for the imaging lens group 30, the media surface of the reflective polarized layer 50, the liquid crystal lens 60, the semi-transparent and semi-reflective layer 40 and the polarization converter 20 are all planar. The distance of the virtual image surface of the near-field display system from the human eyes is 1437.8373 mm, and the distance of the human eyes from the first lens 301 is 15 mm; the entry pupil diameter of the system is 4 mm, the entry pupil position is 0, the exit pupil diameter is 3.555769 mm, the exit pupil position is −35.40031 mm, and the OPD reference position is the exit pupil position; the effective focal length of the near-field display system is 41.95171 mm, the back focal length is 1.892339 mm; and the total length of the near-eye display apparatus is 57.56404 mm. The image space F/# is 10.48793, the near-axis processing F/# is 10.15463, and the working F/# is 10.11048. The image space NA is 0.04917903, the object space NA is 0.001390977; the diaphragm radius is 2 mm, the near-axis imaging height is 37.87739 mm, and the near-axis magnification is 0.02824974; the maximum radial field of view is 43 degrees, and the angular magnification is 1.124932. The main wavelength is 0.5875618 μm.

The light path obtained through near-field display simulation according to the above parameters is shown in FIG. 10, and the spot diagram and the optical transfer function of the above display system are tested in the embodiments of the present disclosure.

Figure 11:
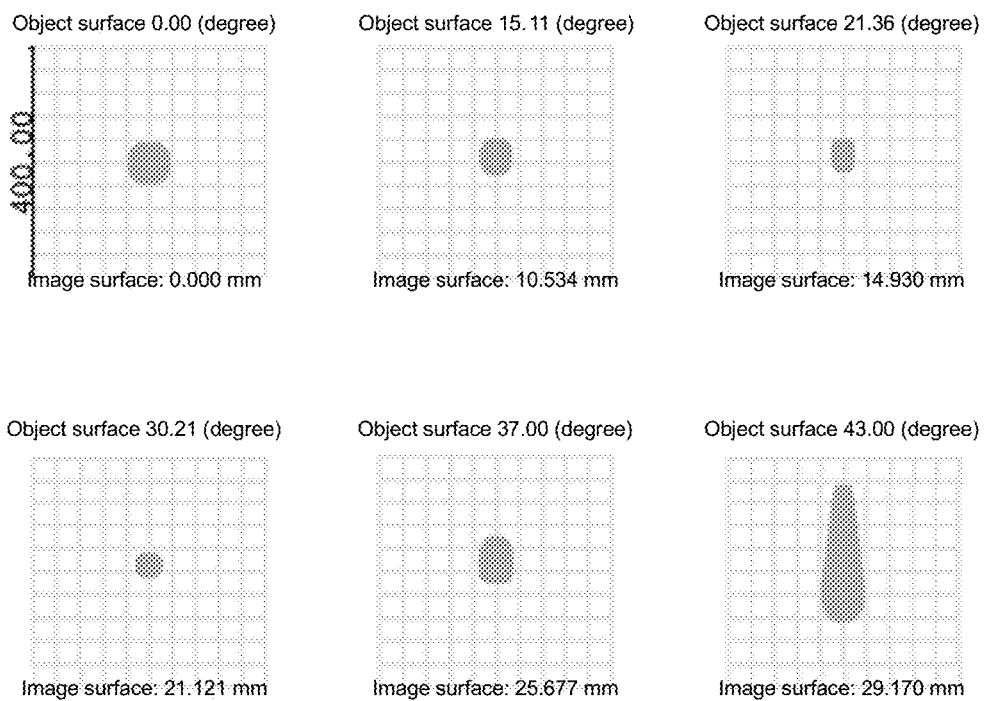
FIG. 11 is a spot diagram of the near-eye display apparatus provided in embodiments of the present disclosure during far-field display.

FIG. 11 is a spot diagram of the near-eye display apparatus provided in embodiments of the present disclosure during far-field display.

As shown in FIG. 11, the object surface represents the location of the virtual image surface, and the image surface represents the location of the human eyes. It can be seen from FIG. 11 that, the image point sizes obtained on the image surface for points at different field angles on the object surface are all in a smaller range, which meets the application requirements of the near-eye display apparatus.

Figure 12:
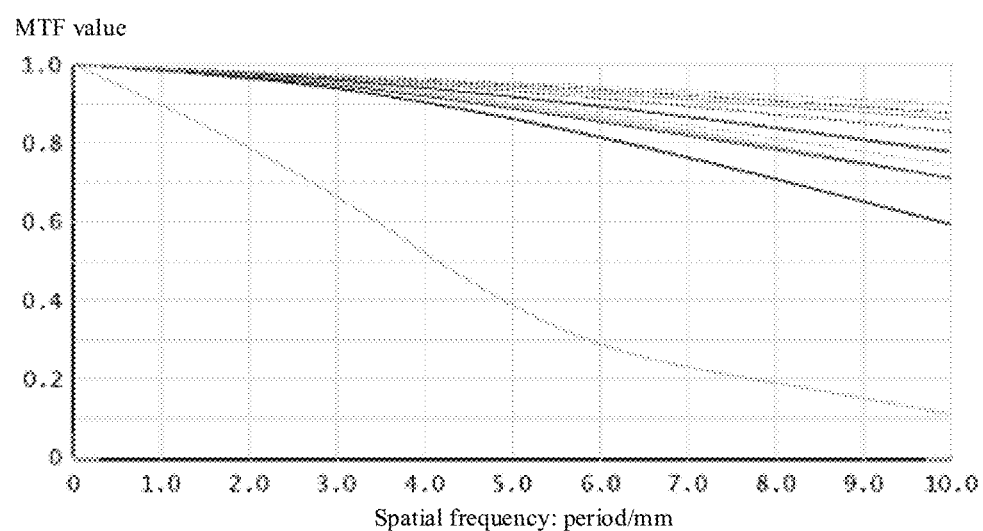
FIG. 12 is a graph of optical transfer function of the near-eye display apparatus provided in embodiments of the present disclosure during far-field display.

FIG. 12 is a graph of optical transfer function of the near-eye display apparatus provided in embodiments of the present disclosure during far-field display.

As shown in FIG. 12, the horizontal coordinate represents the spatial frequency, and the vertical coordinate represents the modulation transfer function, MTF, value, and the MTF value is an important parameter reflecting the optical system. The uppermost curve in FIG. 12 represents the diffraction limit when the field angle is 0. The closer the MTF value at different field angles is to the uppermost curve, the better the imaging effect of the imaging system. It can be seen from FIG. 12 that, after parameter optimization of the near-eye display apparatus provided by embodiments of the present disclosure, the optical transfer function of the full field of view can meet the imaging requirement and has better imaging performance.

The near-eye display apparatus provided in embodiments of the present disclosure includes: a display screen, configured to display a first image and a second image in a time-division mode; a polarization converter, configured to convert the light emitted from the display screen into a first circularly polarized light; an imaging lens group, configured to image the image displayed by the display screen; a semi-transparent and semi-reflective layer, arranged between the polarization converter and the first lens; a reflective polarized layer, arranged on the side, facing away from the polarization converter, of the semi-transparent and semi-reflective layer, to reflect the first linearly polarized light and transmit the second linearly polarized light, wherein the polarization direction of the first linearly polarized light is vertical to the polarization direction of the second linearly polarized light; and a liquid crystal lens, arranged between the semi-transparent and semi-reflective layer and the reflective polarized layer. When the liquid crystal lens is switched between the first phase retardation amount and the second phase retardation amount, the light path of light in the near-eye display apparatus changes, so that the near-eye display apparatus can image at two focal lengths, thereby enabling the human eyes to view an image with a certain depth of field, achieving a three-dimensional display effect and avoiding convergence conflict.

Although preferred embodiments of the present disclosure have been described, additional changes and modifications to these embodiments may be made by those skilled in the art once the underlying inventive concepts are known. Therefore, the appended claims are intended to be construed to include the preferred embodiments and all the changes and modifications that fall within the scope of the present disclosure.

Evidently, those skilled in the art can make various modifications and variations to the present disclosure without departing from the spirit and scope of the present disclosure. Accordingly, the present disclosure is also intended to encompass these modifications and variations thereto so long as the modifications and variations come into the scope of the claims appended to the disclosure and their equivalents.

What is claimed is:

1. A near-eye display apparatus, comprising:
a display screen, configured to display a first image and a second image in a time-division mode;
a polarization converter, arranged on a light emitting side of the display screen and configured to convert light emitted from the display screen into first circularly polarized light;
an imaging lens group, arranged on the light emitting side of the display screen and configured to image an image displayed on the display screen; wherein the imaging lens group at least comprises a first lens;
a semi-transparent and semi-reflective layer, arranged between the polarization converter and the first lens;
a reflective polarized layer, arranged on a side, facing away from the polarization converter, of the semi-transparent and semi-reflective layer, and configured to reflect first linearly polarized light and transmit second linearly polarized light, wherein a polarization direction of the first linearly polarized light is vertical to a polarization direction of the second linearly polarized light; and
a liquid crystal lens, arranged between the semi-transparent and semi-reflective layer and the reflective polarized layer;
wherein the liquid crystal lens generates a first phase retardation amount when the display screen displays the first image, and transmits the first circularly polarized light passing through the semi-transparent and semi-reflective layer, so that the reflective polarized layer partially transmits the first circularly polarized light; and
the liquid crystal lens:
generates a second phase retardation amount when the display screen displays the second image;
converts the first circularly polarized light passing through the semi-transparent and semi-reflective layer into the first linearly polarized light, so that the first linearly polarized light is reflected by the reflective polarized layer;
converts the first linearly polarized light into the first circularly polarized light, so that the first circularly polarized light is reflected by the semi-transparent and semi-reflective layer and then converted into second circularly polarized light rotating in an opposite direction to the first circularly polarized light; and
converts the second circularly polarized light into the second linearly polarized light, so that the second linearly polarized light is transmitted by the reflective polarized layer.

2. The near-eye display apparatus of claim 1, wherein the first phase retardation amount generated by the liquid crystal lens is 0, and the second phase retardation amount generated by the liquid crystal lens is $\pi/2$ or an odd multiple of $\pi/2$.

3. The near-eye display apparatus of claim 1, wherein the imaging lens group further comprises: a second lens;
wherein the second lens is arranged between the polarization converter and the semi-transparent and semi-reflective layer; or
the second lens is arranged between the polarization converter and the display screen.

4. The near-eye display apparatus of claim 1, wherein the display screen is a liquid crystal display;
the polarization converter is a quarter wave plate, and an included angle between a fast axis of the quarter wave plate and a transmission axis of the reflective polarized layer on a light emitting side of the liquid crystal display is 45°; or
the polarization converter is a circular polarizer comprising:
a polarizer, near the liquid crystal display; and
a quarter wave plate, arranged on a side, facing away from the liquid crystal display, of the polarizer;
wherein a transmission axis of the polarizer is parallel to a transmission axis of the reflective polarized layer on a light emitting side of the liquid crystal display, and an included angle between a fast axis of the quarter wave plate and the transmission axis of the reflective polarized layer on the light emitting side of the liquid crystal display is 45°.

5. The near-eye display apparatus of claim 1, wherein the display screen is one of:
organic light-emitting diode display,
micro organic light-emitting diode display, or
micro light-emitting diode display; and
the polarization converter is a circular polarizer.

6. The near-eye display apparatus of claim 4, wherein the polarization converter is attached to a surface, facing the imaging lens group, of the display screen.

7. The near-eye display apparatus of claim 5, wherein the polarization converter is attached to a surface, facing the imaging lens group, of the display screen.

8. The near-eye display apparatus of claim 1, wherein a total thickness of the semi-transparent and semi-reflective layer, the liquid crystal lens and the reflective polarized layer does not exceed 4 mm.

9. The near-eye display apparatus of claim 8, wherein the semi-transparent and semi-reflective layer is arranged on a surface, facing away from the reflective polarized layer, of the liquid crystal lens; and
the reflective polarized layer is arranged on a surface, facing away from the semi-transparent and semi-reflective layer, of the liquid crystal lens.

10. The near-eye display apparatus of claim 1, wherein a surface type of a lens in the imaging lens group is a spherical surface, an aspherical surface, a Fresnel surface or a free-form surface.

11. The near-eye display apparatus of claim 1, wherein a ratio of transmittance of the semi-transparent and semi-reflective layer to reflectivity of the semi-transparent and semi-reflective layer is 1:1.

12. The near-eye display apparatus of claim 1, wherein a range of an effective focal length of the near-eye display apparatus is 15 mm to 55 mm.

13. The near-eye display apparatus of claim 1, further comprising:
a driver chip, connecting the liquid crystal lens and the display screen;
an image processor, connecting the display screen; and
a central processing unit, connecting the driver chip and the image processor;

wherein the image processor is configured to transmit to-be-displayed image data to the display screen under control of the central processing unit; and the driver chip is configured to:
- output a first driving signal to the display screen under control of the central processing unit, such that the display screen displays the first image and the second image in the time-division mode, and
- output a second driving signal to the liquid crystal lens, such that the liquid crystal lens generates the first phase retardation amount when the display screen displays the first image and generates the second phase retardation amount when the display screen displays the second image.

14. The near-eye display apparatus of claim 1, wherein the near-eye display apparatus is a virtual reality apparatus.

* * * * *